Figure 1:
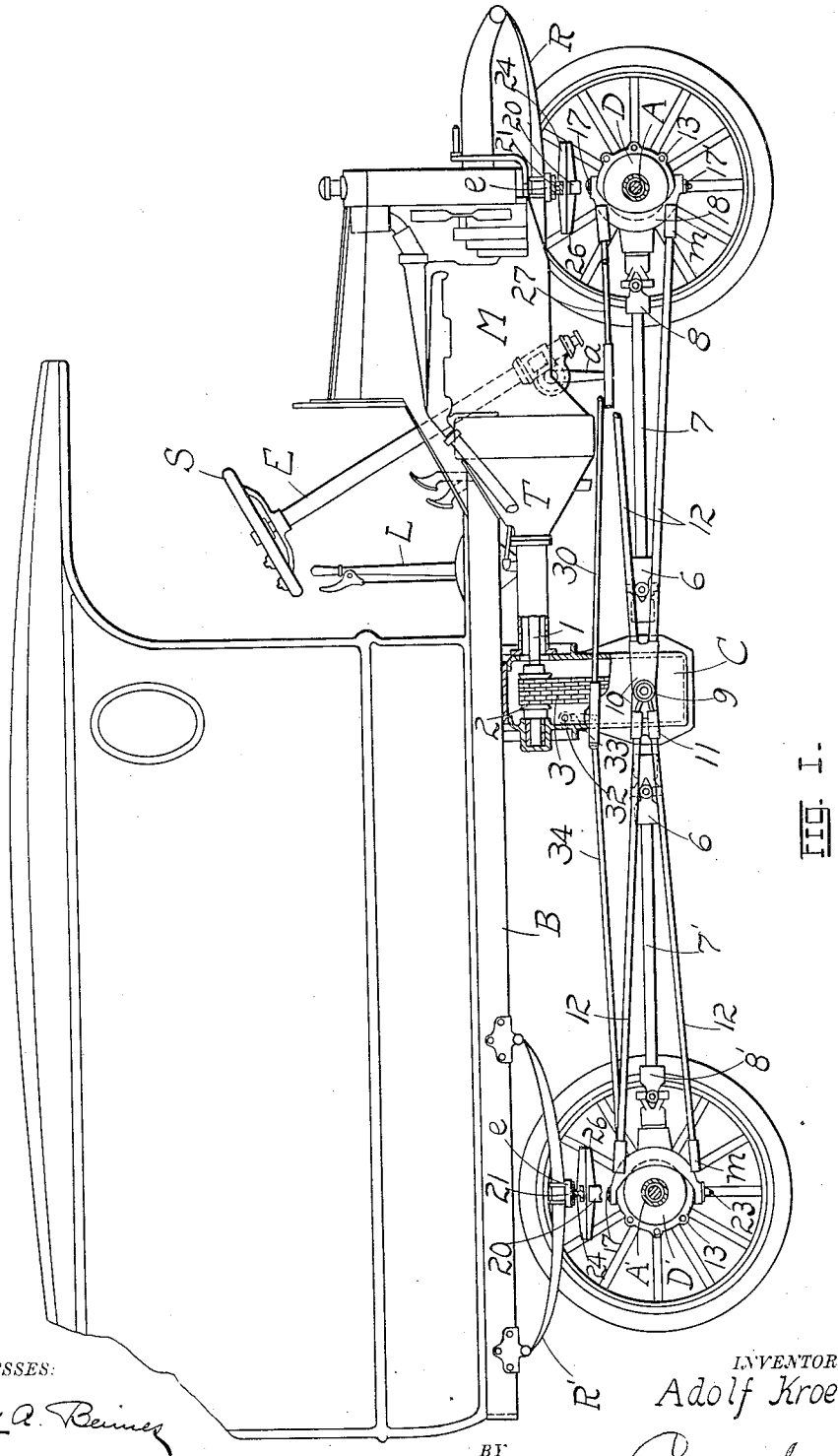

A. KROETER.
AUTOMOBILE PROPELLING AND CONTROLLING MECHANISM.
APPLICATION FILED MAR. 22, 1917.

1,246,116.

Patented Nov. 13, 1917.
7 SHEETS—SHEET 1.

WITNESSES:
Harry A. Beimes
Jos. A. Michel

INVENTOR.
Adolf Kroeter.
BY
Emil Staret
ATTORNEY.

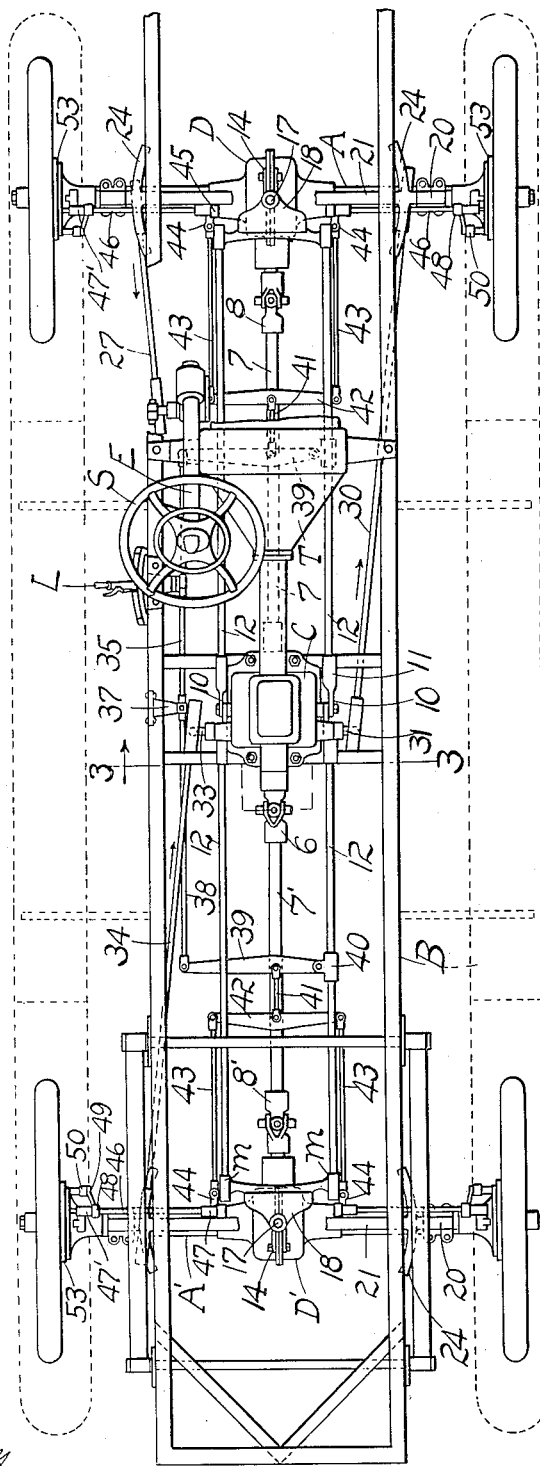

A. KROETER.
AUTOMOBILE PROPELLING AND CONTROLLING MECHANISM.
APPLICATION FILED MAR. 22, 1917.
1,246,116.
Patented Nov. 13, 1917.
7 SHEETS—SHEET 3.
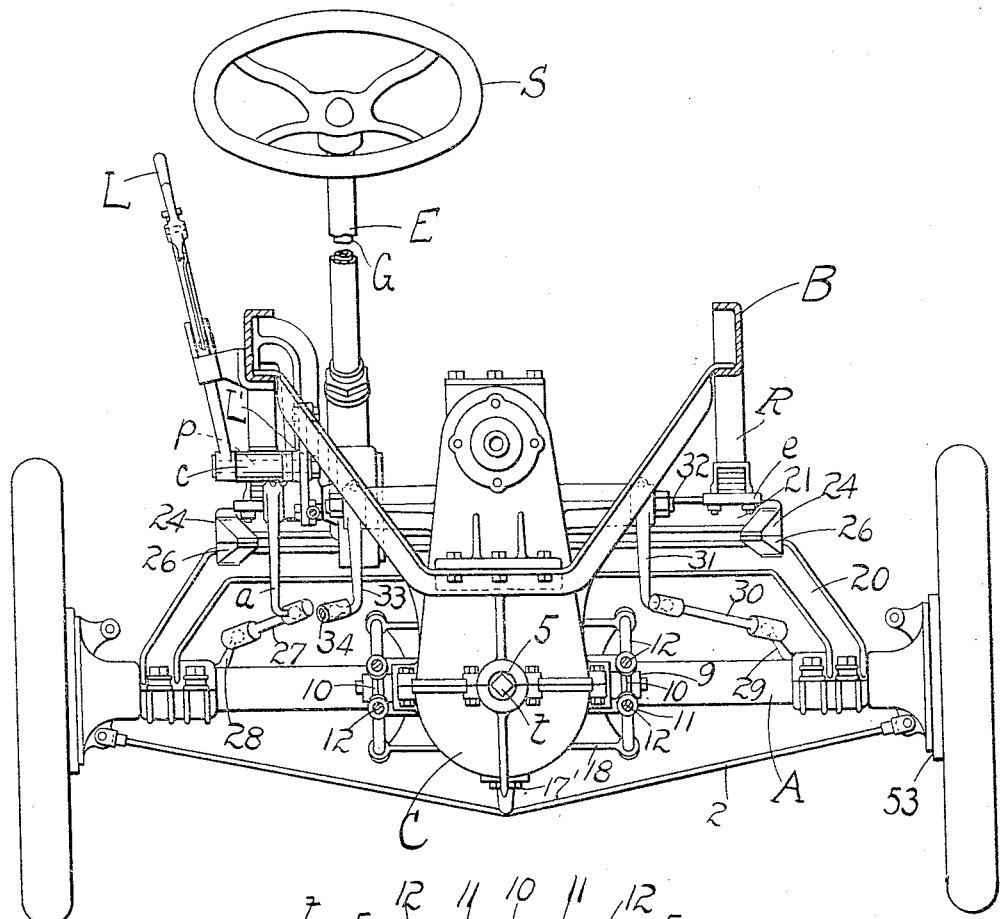
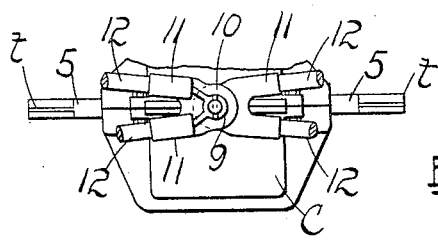
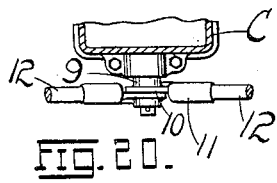
WITNESSES:
Harry A. Bennes
Jos. A. Michel
INVENTOR.
Adolf Kroeter.
BY
Emil Starck
ATTORNEY.

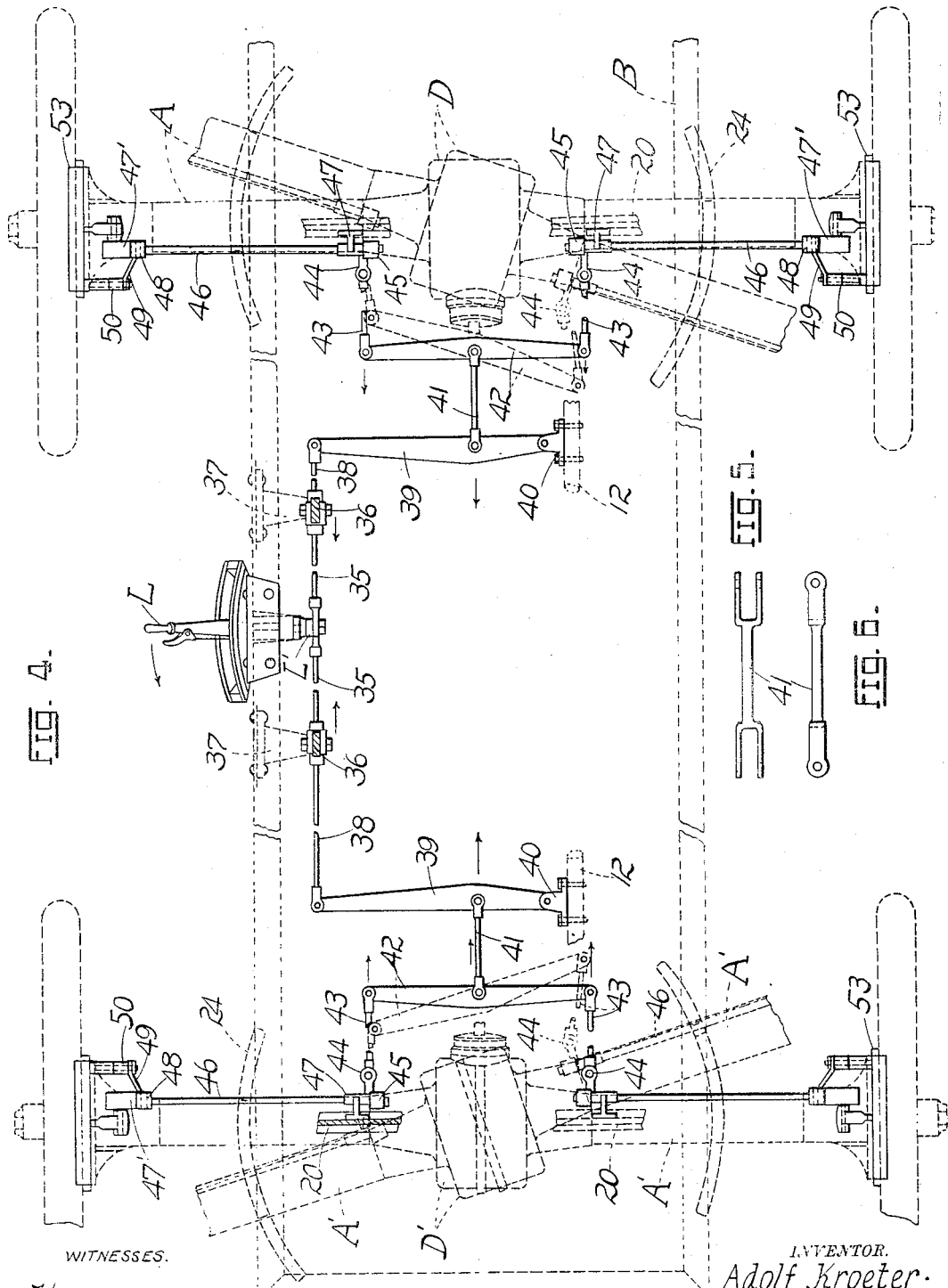

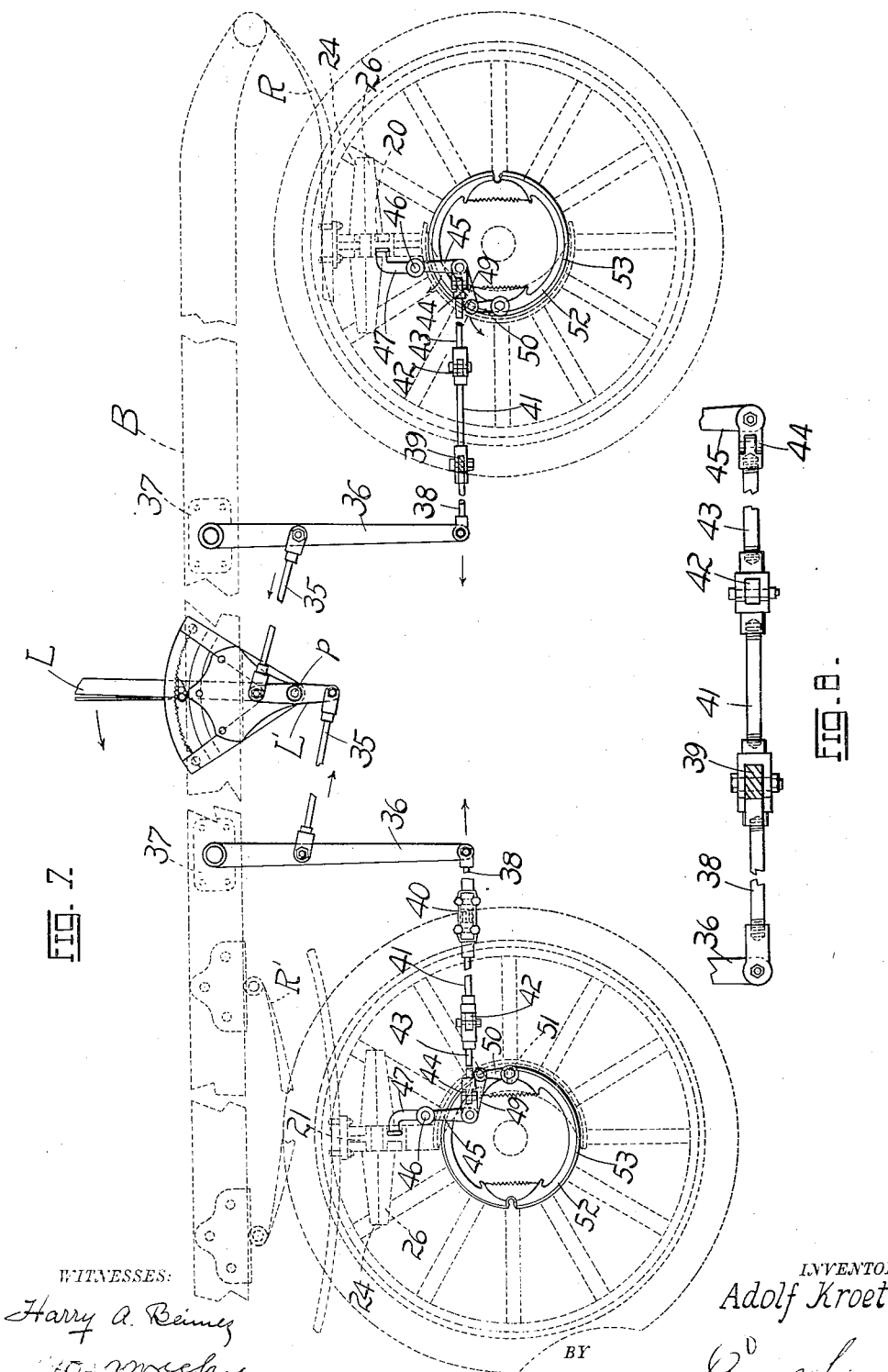

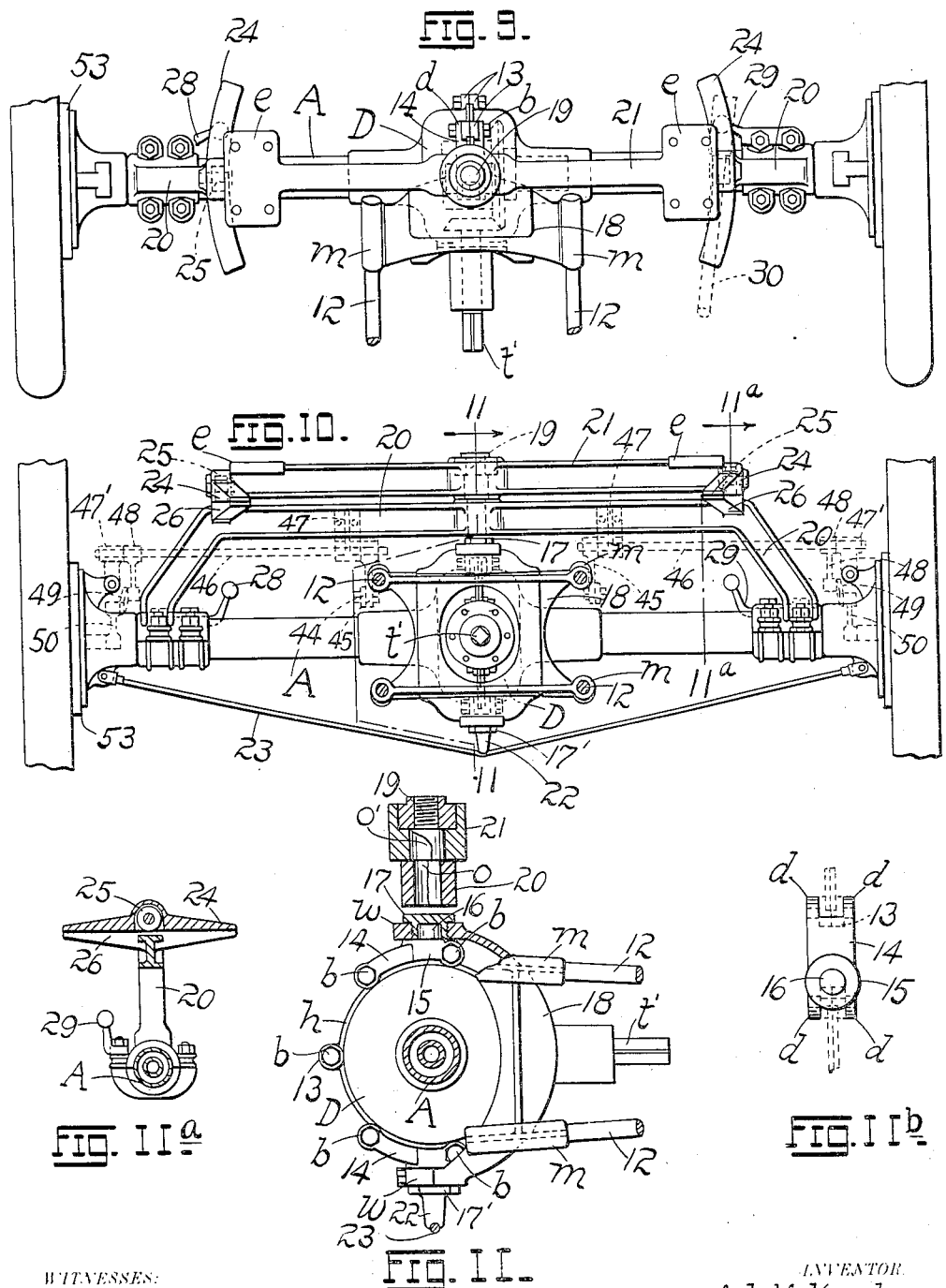

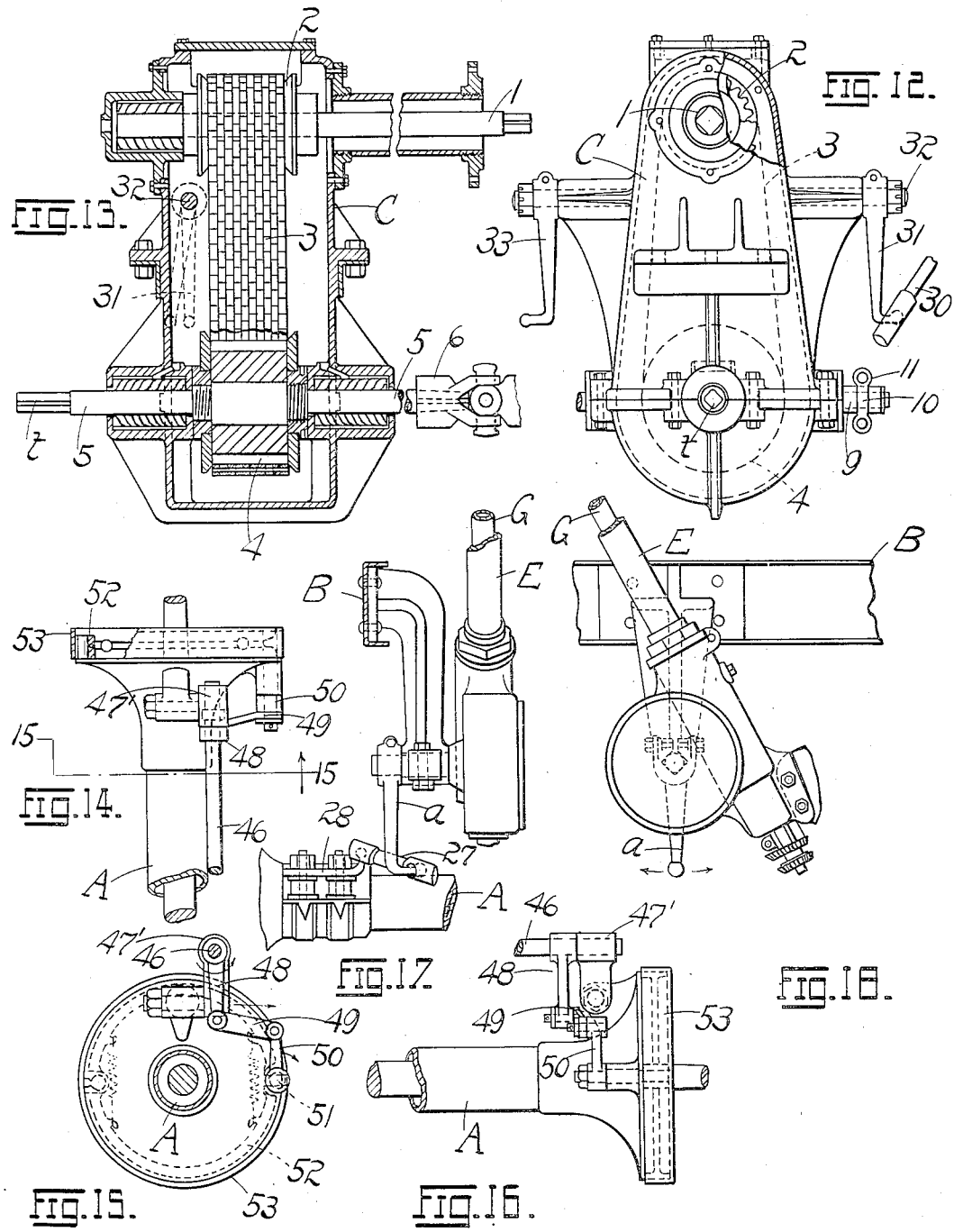

1,246,116.

UNITED STATES PATENT OFFICE.

ADOLF KROETER, OF EAST ST. LOUIS, ILLINOIS.

AUTOMOBILE PROPELLING AND CONTROLLING MECHANISM.

Specification of Letters Patent.   Patented Nov. 13, 1917.

Application filed March 22, 1917.   Serial No. 156,599.

*To all whom it may concern:*

Be it known that I, ADOLF KROETER, a citizen of the United States, residing at East St. Louis, in the county of St. Clair and State of Illinois, have invented certain new and useful Improvements in Automobile Propelling and Controlling Mechanisms, of which the following is a full, clear, and exact description, reference being had to the accompanying drawings, forming a part hereof.

My invention has relation to improvements in driving, brake, and steering mechanism for self-propelled vehicles or automobiles; and it consists in the novel features of construction more fully set forth in the specification and pointed out in the claims.

The object of the present invention is to provide driving mechanism for automobiles which will propel both the rear and front axles simultaneously, suitable provision being made to control said axles by brakes capable of application at one and the same time. A further object is to provide an automobile propelled as aforesaid with steering mechanism to which both axles will respond to cause the vehicle to travel in the desired direction, it being possible to apply the brakes under all conditions of travel and irrespective of the direction in which the vehicle may be steered. A further object of the invention is to provide a front and rear drive without a material change in the construction of well recognized parts of automobiles, and without the necessity of any radical reconstruction either of the frame, or other conventional parts of this class of vehicles. A further object of the invention is to provide a drive and steering and brake mechanism which will be simple, under ready control of the driver, one eminently responsive to the driver's manipulations, and one presenting further and other advantages fully apparent from the following detailed description of the invention in connection with the accompanying drawings in which—

Figure 1 represents a side elevation of a conventional automobile or self-propelled vehicle showing my invention applied thereto with near wheels removed and with parts in section; Fig. 2 is a top plan of the wagon frame showing the application of my invention thereto; Fig. 3 is an enlarged vertical cross-section on the line 3—3 of Fig. 2 with brake mechanism however removed; Fig. 4 is an enlarged top plan of the brake mechanism with parts broken away; Fig. 5 is a detached side elevation of the link interposed between the horizontal lever of the brake mechanism and the equalizer draft-bar; Fig. 6 is a plan of said link; Fig. 7 is an enlarged side elevation of the brake mechanism with parts broken away; Fig. 8 is a still further enlarged side view of the draft equalizer and its immediate connections; Fig. 9 is a top plan of the front axle; Fig. 10 is an inside or rear elevation of the front axle; Fig. 11 is a vertical cross-section on the zig-zag line 11—11 of Fig. 10; Fig. 11ª is a vertical cross-section on the zig-zag line 11ª—11ª of Fig. 10; Fig. 11ᵇ is a top plan of one of the trunnion blocks carried by the axle housing; Fig. 12 is a front elevation of the gear case with parts broken away; Fig. 13 is a vertical middle longitudinal section of Fig. 12; Fig. 14 is a top plan of one of the brake drums showing the brake-band and its connections; Fig. 15 is a vertical cross-section on the line 15—15 of Fig. 14; Fig. 16 is a side elevation of Fig. 15; Fig. 17 is a rear elevation of the lower end of the steering staff with its connections; Fig. 18 is a side elevation of the same; Fig. 19 is a side elevation of the lower part of the gear case showing the terminal connections therewith of the tension members or rods leading from the plate hinged to the trunnion blocks carried by the differential case of the axle housing; and Fig. 20 is a top plan of Fig. 19, the gear case being in section.

Referring to the drawings, M, represents the motor, T, the transmission case, C, an intermediate gear case, B, the frame of the vehicle, A, the front axle, A' the rear axle, D the front differential case or housing, D' the rear differential case or housing, S, the steering wheel, E, the steering staff, G, the steering wheel shaft, *a* (Fig. 17) the steering segment gear ball-crank, L, the brake lever, these, and other parts to be either presently referred to or not mentioned at all being well understood in the art and requiring no detailed description. In the present embodiment of my invention the transmission shaft 1 terminates in the intermediate gear case C (this particular gear case with its gearing I consider new) where it is provided with a flanged driving gear 2 over which passes a conventional chain belt 3, the lower end of the belt passing over a similar gear wheel 4 within the gear case (Fig. 13) said gear 4 being provided with a shaft 5 whose opposite ends project outside the case C, the shaft terminating in square or polygonal coupling extensions $t$ for engaging corresponding sockets of the universal joints 6 carried by the adjacent inner ends of the propelling shafts 7, 7', said shafts being alined with the shaft 5 and extending in opposite directions therefrom. The front end of the forwardly extending shaft 7 terminates in a universal joint 8 whereby it is coupled to the shaft of the gearing of the front differential, the rear end of the rearwardly extending propelling shaft 7' terminating in a universal joint 8' whereby it is coupled to the gearing of the rear differential (Fig. 2). The individual parts referred to are *per se* well understood in the art, and are here shown more or less conventionally. In the present embodiment of my invention the sides of the crank case C are provided with bosses 9 over which are passed the loops or eyes 10 of the anchors 11 secured to the adjacent ends of the pairs of truss or tension rods 12, 12, extending in opposite directions and spreading apart as they approach the front and rear axles respectively (Fig. 1). In the present embodiment of my invention the axle housing or rather that portion forming the differential case D (D') is in two sections, the same being united along the flanges $h$ by the bolts $b$ passed through the lobes or lugs 13 with which said flanges are provided (Fig. 11). Disposed at the top and bottom of each differential case D, D', (a description of one will answer for both, both ends being alike), is an arcuate trunnion block 14 provided with forked terminals $d$, the blocks being of such dimension that the fork members at opposite ends of the block will embrace two consecutive lugs or lobes 13, the same bolts $b$ serving to secure the blocks to the axle housing and the housing sections to each other. The blocks 14 are formed with bosses 15 on their outer faces, the bosses being provided with trunnions 16. When the blocks 14 are in position (Fig. 11) the trunnions 16 come diametrically opposite and vertically over one another, said trunnions being received by the screw cups or bushings 17, 17', carried respectively by the upper and lower terminals or arms $w$ of an anchor plate or frame 18 to which the adjacent ends of the tension rods 12 are secured, the same being received in suitable sockets $m$ with which the plate 18 is provided, or they may be secured in any other suitable mechanical manner. The common axis of the trunnions 16 serves as the axis of oscillation for the axle, said axis being coincident with the axis of the king-bolt 19 passed through the opening $o$ of the yoke 20 carried by the axle, and, through the registering opening $o'$ of the body bolster 21. The bottom bushings or cups 17' are each provded with a strut or projection 22 bearing against the cross tension or truss rod 23 the terminals whereof are secured to the brake-drum terminal of the axle housing (Fig. 10). From the foregoing it will be seen that with any vertical play of the frame B due to a yielding of the springs R, R', the gear case C is free to participate in such vertical play by virtue of the hinged connection between it and the tension rods 12, 12, the latter having sufficient spring or resiliency to permit of such play. In the present embodiment of my invention I provide the terminals of the body bolster 21 with arcuate plates 24 carrying at the center suitable anti-friction rollers 25, said rollers riding freely over the upper faces of corresponding arcuate plates or rails 26 carried by the yoke 20 (Figs. 9, 10, 11$^a$).

The steering staff E and its immediate appurtenances are of the conventional kind and require no detailed description. As well understood in the art the lower end of the steering wheel shaft G terminates in the ball-crank $a$. In the present invention the ball crank $a$ is coupled to the adjacent end of a link 27 whose opposite end is coupled to a ball arm 28 carried at one end of the axle A, the opposite end of the axle carrying a similar ball arm 29 which is secured to the adjacent end of a link 30. The opposite or rear end of the link 30 is in turn connected to a ball crank 31 at the adjacent end of a rock-shaft 32 mounted across the gear case C (Figs. 12, 13,) the opposite end of the shaft carrying a similar ball crank 33 which is in turn coupled to the adjacent end of a link 34, the latter extending rearwardly and its rear end coupled in the same manner to a ball arm at the adjacent end of the rear axle A', the links 30 and 34 being disposed on opposite sides of the longitudinal center of the machine, and connected to the diagonally opposite ends of the axles A, A', respectively. By following the link connections described, it will be obvious that if the steering wheel shaft G be turned in proper direction to exert a pull or draft on the link 27 so as to deflect the axle A counter-clockwise (Fig. 2) the said axle will exert a pull on the link 30 thereby oscillating the crank 31 in a direction to cause the shaft 32 to rock and oscillate the crank 33 in the same direction, that is to say in a direction so as to pull on the link 34. A pull on the link 34 will in turn deflect the rear axle A' clockwise, or the reverse to the deflection of the axle A, permitting the vehicle to readily turn a corner. If the steering wheel shaft is rotated in a direction to push on the link 27 so as to deflect the front axle A clockwise, then necessarily the rear axle A' will be deflected counter-clockwise whereupon the vehicle will turn in the opposite direction. It will be seen that the links 27, 30 and 34 are either all in tension or all in compression depending on which direction the shaft G is turned. In the present embodiment of my invention the springs R, R', are secured to the terminal platforms e of the body bolsters 21.

The vehicle being driven at both ends, it becomes desirable to set the brakes at both ends. This I accomplish by the following mechanism: The brake lever L is pivoted at its lower end to a rocking fulcrum pin or shaft p mounted in the bearing c on the frame B. The inner terminal of the rocking pin or shaft p has secured thereto a lever L' to each terminal of which is pivotally coupled the adjacent end of a link 35 (both sides being alike and hence a description for one will suffice for both) whose opposite end is pivotally connected at an intermediate point of a lever 36 depending from the bracket 37 carried by the frame B. The lower ends of the levers 36 are coupled pivotally to the adjacent terminals of suitable links 38 the opposite end of each link being pivotally connected to the adjacent end of a horizontally oscillating lever 39 hinged at one end to a bracket 40 secured to the upper member of the pair of tension rods 12 opposite thereto. Leading from an intermediate point on the lever 39 is a link 41 coupled at one end pivotally to said lever and at the opposite end to an equalizer draft-bar 42 to the opposite ends of which are pivotally coupled the adjacent terminals of the rods 43 whose outer ends are pivotally secured to forked blocks 44 each of which is hinged to the lower terminal of an arm 45 depending from and rigidly secured at its upper end to the inner terminal of a transversely disposed rock-shaft 46 mounted in brackets 47, 47', carried by the yoke 20 and axle housing respectively. The outer end of each rock-shaft 46 is provided with an oscillating arm 48 to whose oscillating terminal is coupled the adjacent end of a link 49 whose opposite end is pivotally coupled to one end of an oscillating or rocker arm 50 whose opposite end actuates or rocks the usual cam 51 which expands the brake band 52 against the walls of the brake drum 53 well understood in the art, and only conventionally shown herein. The mounting of the rock-shaft 46 between the depending bracket 47 and the upwardly projecting bracket 47' is not the only method which can be resorted to, any equivalent means for mounting said shaft falling within the spirit of my invention. The rock-shaft 46 is virtually carried by the axle housing and whenever the housing and axle and yoke 20 are deflected to the right or left or from a position at right angles to the longitudinal axis of the vehicle, the rock-shaft is deflected also. Since however the rock-shaft 46 directly actuates the arm 48, it follows that whatever be the angle of deflection of the axle, the brakes may always be applied. Their manner of application is readily understood from Figs. 4 and 7 in which the disengaged or normal position of the several parts is shown. Suppose however that the driver pulls the brake lever L in the direction shown by the arrows in said figures. The result is that the rocking pin or shaft p will be rocked counter-clockwise, the lever L' oscillating in the same direction. Accordingly, the links 35 will be pulled in the direction shown by the arrows drawing the levers 36 toward each other. These will draw together the rods 38 causing the levers 39 to oscillate inward or toward each other and thereby pull on the rods 41 which will in turn pull on the equalizer bars 42. These bars drawing on the rods 43 will exert a pull on the blocks or links 44 thereby oscillating the levers 45 which in turn will rotate the rock-shafts 46 in proper direction to apply the brakes to the several drums 53.

The operations of the steering and brake mechanisms having now been described, only a word need be said about the propelling mechanism. It is obvious that when the motor is set in motion, the transmission gear will impart rotation to the gearing in the gear case C thereby setting in motion the propelling shafts 7, 7', which, acting through the gearing in the differential cases D, D', will in turn rotate the axles A, A', as clearly apparent from the drawings. The universal joints 6, 8, 8', permit of rotation of the shafts 7, 7', and of the axles whether the latter are at right angles to the longitudinal axis of the vehicle and the vehicle traveling in a straight line, or whether the axles are deflected for purposes of turning the vehicle to the right or left, the coupling terminals t allowing for any sliding movement necessarily imparted to the joints under working conditions. It is of course understood that the shafts 7, 7', rotate in the same direction, making it necessary to dispose the gearing in the differential cases D, D', on the reverse sides of said shafts in order that the front and rear axles A, A', may rotate in the same direction. This is perfectly obvious and requires no further description.

The above structure embodies a drive for the front and rear axles, brakes for the front and rear axles, and steering mechanism for both axles, adapting the vehicle to a variety of service not possible with the conventional automobile or motor truck wherein the drive and brake mechanisms are confined to the rear axle, and the steering device to the front axle. It is of course understood that I am not to be restricted to the details here shown as they may in a measure be departed from without affecting the nature or spirit of my invention. Features shown but not alluded to are well understood in the art and require no description in the present connection.

The sliding joint terminals *t* need not be restricted to the shaft 5, and the same kind of a terminal *t'* may be formed on the projecting portion of the gearing leading from the differential case D (D') as shown in Figs. 9, 10, and 11.

Having described my invention what I claim is:

1. In a self-propelled vehicle provided with front and rear axles, differential cases therefor, a gear case disposed at an intermediate point between the axles, suitable anchor plates, trunnion blocks carried by the differential cases and pivotally securing the plates to the cases, and tension rods leading from the sides of the anchor plates to the gear case, and means for securing the inner ends of the tension rods to the gear case.

2. In a self-propelled vehicle provided with front and rear axles, differential cases therefor, a gear case disposed at an intermediate point between the axles, suitable anchor plates, trunnion blocks carried by the differential cases and pivotally securing the plates to the cases, and tension rods leading in pairs from the sides of the anchor plates toward the gear case, and means for securing the inner ends of the tension rods to the sides of the gear case.

3. In combination with an axle and a centrally disposed differential case, a yoke spanning the case and having its terminals secured to the axle, a body bolster, a king-bolt connecting the bolster to the yoke, the axis of the bolt being coincident with the axis of oscillation of the axle and the differential case thereof, plates terminating the body bolster, and rails on the yoke coöperating with said plates.

4. In a self-propelled vehicle provided with front and rear axles, differential cases therefor, a gear case disposed at an intermediate point between the axles, suitable anchor plates, trunnion blocks carried by the differential cases and pivotally securing the plates to the cases, and tension or truss rods leading in pairs from the sides of the anchor plates and converging toward the gear case, and means for securing the meeting ends of the truss rods to the opposite sides of the gear case.

5. In combination with an axle and centrally disposed differential case, a yoke spanning the case and having its terminals secured to the axle, a body bolster, a king-bolt connecting the bolster to the yoke, the axis of the bolt being coincident with the axis of oscillation of the axle and the differential case thereof, plates terminating the body bolster, rails on the yoke coöperating with said plates, and anti-friction rollers interposed between the plates and rails.

In testimony whereof I affix my signature, in presence of two witnesses.

ADOLF KROETER.

Witnesses:
EMIL STAREK,
JOS. A. MICHEL.